(12) United States Patent
Koskela et al.

(10) Patent No.: US 11,949,485 B2
(45) Date of Patent: Apr. 2, 2024

(54) SECONDARY CELL BEAM RECOVERY (71) Applicant: Nokia Technologies Oy, Espoo (FI)

(72) Inventors: Timo Koskela, Oulu (FI); Samuli Turtinen, Ii (FI); Jorma Kaikkonen, Oulu (FI); Mihai Enescu, Espoo (FI); Sami Hakola, Kempele (FI); Juha Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 380 days.

(21) Appl. No.: 17/049,057

(22) PCT Filed: Apr. 12, 2019

(86) PCT No.: PCT/FI2019/050295
§ 371 (c)(1),
(2) Date: Oct. 20, 2020

(87) PCT Pub. No.: WO2019/215381
PCT Pub. Date: Nov. 14, 2019

(65) Prior Publication Data
US 2021/0258062 A1 Aug. 19, 2021

Related U.S. Application Data

(60) Provisional application No. 62/669,719, filed on May 10, 2018.

(51) Int. Cl.
*H04B 7/06* (2006.01)
*H04W 16/28* (2009.01)
(Continued)

(52) U.S. Cl.
CPC .......... *H04B 7/0695* (2013.01); *H04W 16/28* (2013.01); *H04W 24/10* (2013.01);
(Continued)

(58) Field of Classification Search
None
See application file for complete search history.

(56) References Cited

U.S. PATENT DOCUMENTS 9,900,891 B1 * 2/2018 Islam ................ H04W 36/0079
2016/0219619 A1 7/2016 Guo
(Continued)

FOREIGN PATENT DOCUMENTS

CN 107005932 A 8/2017
TW 201330569 A 7/2013
(Continued)

OTHER PUBLICATIONS

Extended European Search Report received for corresponding European Patent Application No. 19799915.4, dated Jun. 1, 2022, 23 pages.
(Continued)

*Primary Examiner* — Scott M Sciacca
(74) *Attorney, Agent, or Firm* — SQUIRE PATTON BOGGS (US) LLP (57) ABSTRACT

According to a first embodiment, a method may include determining, by a user equipment, that a secondary cell beam failure has occurred at a medium access control layer. The method may further include determining, by the user equipment, one or more other secondary cell candidates based on at least candidate beam measurements of a primary cell. The method may further include transmitting, by the user equipment, one or more data packets related to one or more selected other secondary cell candidates.

15 Claims, 5 Drawing Sheets

(51) Int. Cl.
  *H04W 24/10* (2009.01)
  *H04W 74/02* (2009.01)
  *H04W 74/0833* (2024.01)
  *H04W 76/19* (2018.01)
  *H04W 80/02* (2009.01)
(52) U.S. Cl.
  CPC ....... *H04W 74/02* (2013.01); *H04W 74/0833* (2013.01); *H04W 76/19* (2018.02); *H04W 80/02* (2013.01)

(56) References Cited

U.S. PATENT DOCUMENTS

| | | | |
|---|---|---|---|
| 2016/0269931 | A1 | 9/2016 | Dinan |
| 2018/0278310 | A1* | 9/2018 | Lee ...................... H04B 7/0632 |
| 2019/0081753 | A1* | 3/2019 | Jung ...................... H04B 7/088 |
| 2019/0274169 | A1* | 9/2019 | Tsai .................. H04W 56/0045 |
| 2020/0280409 | A1* | 9/2020 | Grant .................... H04L 5/0023 |
| 2020/0322035 | A1* | 10/2020 | Shi ........................ H04B 7/0639 |
| 2020/0374960 | A1* | 11/2020 | Deenoo ................. H04W 76/19 |

FOREIGN PATENT DOCUMENTS

| | | |
|---|---|---|
| WO | 2018/064483 A1 | 4/2018 |
| WO | 2018/067307 A1 | 4/2018 |
| WO | 2019/193239 A1 | 10/2019 |

OTHER PUBLICATIONS

"WF on Beam Failure Recovery in CA", R1-1803367, CATT, Feb. 28, 2018, 4 pages.
"Discussions on RA for SCells BFR", 3GPP TSG-RAN WG2 Meeting 102, R2-1805905, Agenda: 10.3.1.4.2, Huawei, Apr. 16-20, 2018, 5 pages.
"MAC and PHY operation for beam failure recovery request", 3GPP TSG-RAN WG2 NR Ad hoc 1801, R2-1801476, Agenda: 10.3.1.4.2, LG Electronics Inc, Jan. 22-26, 2018, pp. 1-4.
Office action received for corresponding Korean Patent Application No. 2020-7035265, dated Dec. 17, 2021, 10 pages of office action and 5 pages of translation available.
Office action received for corresponding Indian Patent Application No. 202047052779, dated Jan. 3, 2022, 8 pages.
Office action received for corresponding Japanese Patent Application No. 2021-510548, dated Jan. 4, 2022, 4 pages of office action and 2 pages of translation available.
"On beam failure detection and recovery using random access", 3GPP TSG-RAN WG2 Meeting 101bis, R2-1805005, Agenda: 10.3.1.4.2, Intel Corporation, Apr. 16-20, 2018, pp. 1-3.
"Remaining issues on beam recovery", 3GPP TSG RAN WG1 Meeting #92bis, R1-1804975, Agenda: 7.1.2.2.4, Ericsson, Apr. 16-20, 2018, 9 pages.
"SCell Beam Failure Recovery", 3GPP TSG-RAN WG2 Meeting #101bis, R2-1805342, Agenda: 10.3.1.4.2, Nokia, Apr. 16-20, 2018, 3 pages.
"SCell Beam Failure Recovery", 3GPP TSG-RAN WG2 Meeting #102, R2-1808024, Agenda: 10.3.1.4.2, Nokia, May 21-25, 2018, 2 pages.
Partial European Search Report received for corresponding European Patent Application No. 19799915.4, dated Jan. 10, 2022, 15 pages.
"Summary 2 on Remaing issues on Beam Failure Recovery", 3GPP TSG RAN WG1 Meeting #92bis, R1-1805689, Agenda: 7.1.2.2.4, MediaTek Inc, Apr. 16-20, 2018, 21 pages.
"Beam failure recovery procedure", 3GPP TSG-RAN WG1 #92b, R1-1804788, Agenda: 7.1.2.2.4, Qualcomm, Apr. 16-20, 2018, pp. 1-10.
Office action received for corresponding Korean Patent Application No. 2020-7035265, dated Jun. 8, 2022, 8 pages of office action and 5 pages of translation available.
Office action received for corresponding Japanese Patent Application No. 2021-510548, dated Jun. 22, 2022, 2 pages of office action and no page of translation available.
Allowance received for corresponding Korean Patent Application No. 2020-7035265, dated Nov. 14, 2022, 3 pages of Allowance and 1 page of translation available.
Office action received for corresponding Japanese Patent Application No. 2022-015277, dated Jan. 24, 2023, 5 pages of office action and 5 pages of translation available.
"Remaining details on beam recovery", 3GPP TSG RAN WG1 Meeting AH 1801, R1-1800111, Agenda: 7.2.2.4, ZTE, Jan. 22-26, 2018, 7 pages.
"Remaining issues on beam failure recovery", 3GPP TSG RAN WG1 Meeting #92, R1-1801454, Agenda: 7.1.2.2.4, Huawei, Feb. 26-Mar. 2, 2018, 8 pages.
Extended European Search Report received for corresponding European Patent Application No. 22206698.7, dated Jan. 25, 2023, 10 pages.
"3rd Generation Partnership Project; Technical Specification Group Radio Access Network; NR; Physical layer procedures for control (Release 15)", 3GPP TS 38.213, V15.1.0, Mar. 2018, pp. 1-77.
"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.
International Search Report and Written Opinion received for corresponding Patent Cooperation Treaty Application No. PCT/FI2019/050295, dated Jun. 7, 2019, 17 pages.
"Summary 2 on Remaing issues on Beam Failure Recovery", 3GPP TSG RAN WG1 Meeting #92, R1-1803441, Agenda: 7.1.2.2.4, MediaTek Inc, Feb. 26-Mar. 2, 2018, 27 pages.
"Discussion of Beam Failure Recovery for Carrier Aggregation", 3GPP TSG RAN WG1 Meeting #92, R1-1804211, Agenda: 7.1.2.2.4, Lenovo, Apr. 16-20, 2018, 3 pages.
"Discussion on the SCell Bfr", 3GPP TSG-RAN WG2 Meeting #101bis, R2-1804696, Agenda: 10.3.1.4.2, Vivo, Apr. 16-20, 2018, 6 pages.
"Corrections on Beam Failure Recovery", 3GPP TSG RAN WG1 Meeting #92bis, R1-1804359, Agenda: 7.1.2.2.4, Samsung, Apr. 16-20, 2018, 5 pages.
"CR to 38.213 capturing the NR ad-hoc 1801 and RAN1#92 meeting agreements", 3GPP TSG-RAN1 Meeting #92, R1-1803554, Samsung, Feb. 26-Mar. 1, 2018, 81 pages.
Extended European Search Report corresponding to EP Application No. 22206703.5, dated Feb. 24, 2023.
Japanese Office Action, with English language translation, corresponding to JP Application No. 2022-015276, dated Feb. 21, 2023.
Korean Office Action, with English Summary, corresponding to KR Application No. 10-2023-7005050, dated May 15, 2023.
Japanese Office Action, with English translation, corresponding to JP Application No. 2022-015276, dated Jun. 13, 2023.
Chinese Office Action corresponding to CN Application No. 201980031292.6, dated Dec. 5, 2023.
European Communication pursuant to Article 94(3) EPC, corresponding to EP Application No. 19 799 915.4, dated Nov. 6, 2023.

* cited by examiner

SECONDARY CELL BEAM RECOVERY

RELATED APPLICATION

This application was originally filed as PCT Application No. PCT/FI2019/050295 on Apr. 12, 2019, which claims priority from U.S. Application No. 62/669,719 filed May 10, 2018, each of which is incorporated herein by reference in its entirety.

CROSS REFERENCE TO RELATED APPLICATION

This application claims the benefit of U.S. Provisional Application No. 62/669,719, filed May 10, 2018. The entire content of the above-referenced application is hereby incorporated by reference.

BACKGROUND

Field

Certain embodiments may relate to wireless communication systems. For example, some embodiments may relate to beamforming techniques for secondary cells.

Description of the Related Art

A random access channel (RACH) procedure, such as contention-free random access (CFRA) or contention-based random access (CBRA), may be initiated by a user equipment (UE) for beam failure recovery techniques on a primary cell. Beam failure recovery techniques, also referred to as link reconfiguration, may recover a lost link connection. For example, beam failure recovery procedures may detect when one or more serving control channel (PDCCH) links are in failure conditions and require recovery. To recover the failed PDCCH links, UE may transmit signals to the network to indicate link failure and potential link replacements.

However, challenges arise in beam failure recovery techniques that involve reference signals across carriers where a primary cell and one or more secondary cells operate with different beam failure detection reference signals.

SUMMARY

In accordance with some embodiments, a method may include determining, by a user equipment, that a secondary cell beam failure has been determined by at least at a medium access control layer. The method may further include determining, by the user equipment, one or more other secondary cell candidates based on at least candidate beam measurements of a primary cell. The method may further include transmitting, by the user equipment, one or more data packets related to one or more selected other secondary cell candidates.

In accordance with some embodiments, a method may include receiving, by a network entity, an indication of a failure of a primary cell and/or secondary cell. The method may further include in response to receiving a secondary cell beam failure recovery medium access control control element, determining, by the network entity, a user equipment spatial receiving filter for receiving a response for a beam failure recovery on the secondary cell. The method may further include selecting, by the network entity, candidate beam measurements from the physical layer of the secondary cell.

In accordance with some embodiments, a method may include performing, by a user equipment, one or more measurements of one or more serving cells. The one or more serving cells are primary and/or secondary serving cells. The method may further include receiving, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The method may further include monitoring the secondary cell physical downlink control channel for reception of downlink control information based on the transmitted measurement results or an indication based on the obtained measurement results. The method may further include reporting the one or more channel state information reference signal resource indexes, one or more synchronization signal/physical broadcast channel configuration indexes, and one or more corresponding reference signal measurement results.

In accordance with some embodiments, an apparatus may include means for determining that a secondary cell beam failure has been determined by at least at a medium access control layer. The apparatus may further include means for determining one or more other secondary cell candidates based on at least candidate beam measurements of a primary cell. The apparatus may further include means for transmitting one or more data packets related to one or more selected other secondary cell candidates.

In accordance with some embodiments, an apparatus may include means for receiving an indication of a failure of a primary cell and/or secondary cell. The apparatus may further include means for determining a user equipment spatial receiving filter for receiving a response for a beam failure recovery on the secondary cell, in response to receiving a secondary cell beam failure recovery medium access control control element. The apparatus may further include means for selecting candidate beam measurements from the physical layer of the secondary cell.

In accordance with some embodiments, an apparatus may include means for performing one or more measurements of one or more serving cells. The one or more serving cells are primary and/or secondary serving cells. The apparatus may further include means for receiving, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The apparatus may further include means for monitoring the secondary cell physical downlink control channel for reception of downlink control information based on the transmitted measurement results or an indication based on the obtained measurement results. The apparatus may further include means for reporting the one or more channel state information reference signal resource indexes, one or more synchronization signal/physical broadcast channel configuration indexes, and one or more corresponding reference signal measurement results.

In accordance with some embodiments, an apparatus may include at least one processor and at least one memory including computer program code. The at least one memory and the computer program code may be configured to, with the at least one processor, cause the apparatus to at least determine that a secondary cell beam failure has been determined by at least at a medium access control layer. The at least one memory and the computer program code may be further configured to, with the at least one processor, cause the apparatus to at least determine one or more other secondary cell candidates based on at least candidate beam measurements of a primary cell. The at least one memory and the computer program code may be further configured to, with the at least one processor, cause the apparatus to at least transmit one or more data packets related to one or more selected other secondary cell candidates.

In accordance with some embodiments, an apparatus may include at least one processor and at least one memory including computer program code. The at least one memory and the computer program code may be configured to, with the at least one processor, cause the apparatus to at least receive an indication of a failure of a primary cell and/or secondary cell. The at least one memory and the computer program code may be further configured to, with the at least one processor, cause the apparatus to at least, in response to receiving a secondary cell beam failure recovery medium access control control element, determine, a user equipment spatial receiving filter for receiving a response for a beam failure recovery on the secondary cell. The at least one memory and the computer program code may be further configured to, with the at least one processor, cause the apparatus to at least select candidate beam measurements from the physical layer of the secondary cell.

In accordance with some embodiments, an apparatus may include at least one processor and at least one memory including computer program code. The at least one memory and the computer program code may be configured to, with the at least one processor, cause the apparatus to at least perform one or more measurements of one or more serving cells. The one or more serving cells are primary and/or secondary serving cells. The at least one memory and the computer program code may be further configured to, with the at least one processor, cause the apparatus to at least receive, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The at least one memory and the computer program code may be further configured to, with the at least one processor, cause the apparatus to at least monitor the secondary cell physical downlink control channel for reception of downlink control information based on the transmitted measurement results or an indication based on the obtained measurement results. The at least one memory and the computer program code may be further configured to, with the at least one processor, cause the apparatus to at least report the one or more channel state information reference signal resource indexes, one or more synchronization signal/physical broadcast channel configuration indexes, and one or more corresponding reference signal measurement results.

In accordance with some embodiments, a non-transitory computer readable medium may be encoded with instructions that may, when executed in hardware, perform a method. The method may determine that a secondary cell beam failure has been determined by at least at a medium access control layer. The method may further determine one or more other secondary cell candidates based on at least candidate beam measurements of a primary cell. The method may further transmit one or more data packets related to one or more selected other secondary cell candidates.

In accordance with some embodiments, a non-transitory computer readable medium may be encoded with instructions that may, when executed in hardware, perform a method. The method may receive an indication of a failure of a primary cell and/or secondary cell. The method may further, in response to receiving a secondary cell beam failure recovery medium access control control element, determine a user equipment spatial receiving filter for receiving a response for a beam failure recovery on the secondary cell. The method may further select candidate beam measurements from the physical layer of the secondary cell.

In accordance with some embodiments, a non-transitory computer readable medium may be encoded with instructions that may, when executed in hardware, perform a method. The method may perform one or more measurements of one or more serving cells. The one or more serving cells are primary and/or secondary serving cells. The method may further receive, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The method may further monitor the secondary cell physical downlink control channel for reception of downlink control information based on the transmitted measurement results or an indication based on the obtained measurement results. The method may further report the one or more channel state information reference signal resource indexes, one or more synchronization signal/physical broadcast channel configuration indexes, and one or more corresponding reference signal measurement results.

In accordance with some embodiments, a computer program product may perform a method. The method may determine that a secondary cell beam failure has been determined by at least at a medium access control layer. The method may further determine one or more other secondary cell candidates based on at least candidate beam measurements of a primary cell. The method may further transmit one or more data packets related to one or more selected other secondary cell candidates.

In accordance with some embodiments, a computer program product may perform a method. The method may receive an indication of a failure of a primary cell and/or secondary cell. The method may further, in response to receiving a secondary cell beam failure recovery medium access control control element, determine a user equipment spatial receiving filter for receiving a response for a beam failure recovery on the secondary cell. The method may further select candidate beam measurements from the physical layer of the secondary cell.

In accordance with some embodiments, a computer program product may perform a method. The method may perform one or more measurements of one or more serving cells. The one or more serving cells are primary and/or secondary serving cells. The method may further receive, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The method may further monitor the secondary cell physical downlink control channel for reception of downlink control information based on the transmitted measurement results or an indication based on the obtained measurement results. The method may further report the one or more channel state information reference signal resource indexes, one or more synchronization signal/physical broadcast channel configuration indexes, and one or more corresponding reference signal measurement results.

In accordance with some embodiments, an apparatus may include circuitry configured to determine that a secondary cell beam failure has been determined by at least at a medium access control layer. The circuitry may further determine one or more other secondary cell candidates based on at least candidate beam measurements of a primary cell. The circuitry may further transmit one or more data packets related to one or more selected other secondary cell candidates.

In accordance with some embodiments, an apparatus may include circuitry configured to receive an indication of a failure of a primary cell and/or secondary cell. The circuitry may further, in response to receiving a secondary cell beam failure recovery medium access control control element, determine a user equipment spatial receiving filter for receiving a response for a beam failure recovery on the secondary cell. The circuitry may further select candidate beam measurements from the physical layer of the secondary cell.

In accordance with some embodiments, an apparatus may include circuitry configured to perform one or more measurements of one or more serving cells. The one or more serving cells are primary and/or secondary serving cells. The circuitry may further receive, from the network, channel state information reference signal resource indexes, one or more synchronization signal/physical broadcast channel configuration indexes, and one or more corresponding reference signal measurement results. The one or more corresponding reference signal measurement results include one or more of reference signal receive power, receive power measurements, reference signal receive quality, hypothetical block error rate, signal-to-interference-plus-noise ratio. The circuitry may further monitor the secondary cell physical downlink control channel for reception of downlink control information based on the transmitted measurement results or an indication based on the obtained measurement results. The circuitry may further report the one or more channel state information reference signal resource indexes, one or more synchronization signal/physical broadcast channel configuration indexes, and one or more corresponding reference signal measurement results.

BRIEF DESCRIPTION OF THE DRAWINGS

For proper understanding of this disclosure, reference should be made to the accompanying drawings, wherein.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

Certain embodiments contained herein may provide significant technical advantages. For example, certain embodiments may avoid a panel activity delay in the event the network indicates an assumed candidate as a new Transmission Configuration Indication (TCI) state. In addition, secondary cell signaling may be used to send a Medium Access Control (MAC) Control Element (CE), which confirms that the link is operational, and that the MAC CE needs to be acknowledged using the primary cell.

In case the network decides to activate a PDCCH TCI state of which the user equipment is not currently aligned, such as where the alignment does not correspond to the new TCI state indicated by the network, the network may use a primary cell downlink to signal the new TCI state to the user equipment.

Figure 1:
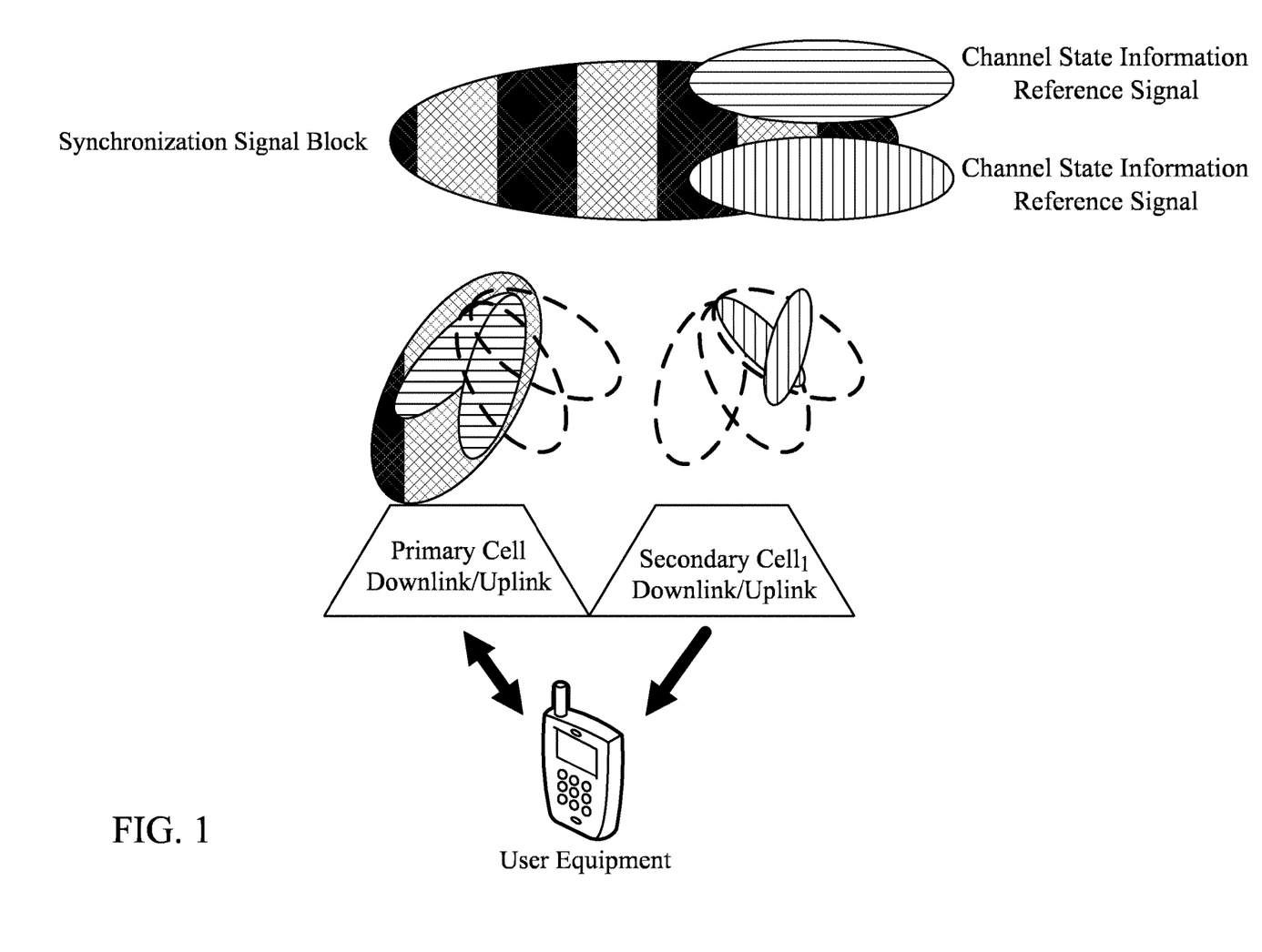
FIG. 1 illustrates an example of a system according to certain embodiments.

For example, FIG. 1 illustrates an example of a secondary cell without a synchronization signal block in a failure condition based on CSI-RS, and the UE cannot indicate any new Channel State Information Reference Signal (CSI-RS) candidates on the secondary cell. Since the secondary cell does not have a synchronization signal block, the user equipment cannot assume a fallback candidate with a periodic signal specific to a secondary cell to be transmitted. In this example, the primary cell, master cell group, or primary secondary cell of the secondary cell group in context of dual connectivity, is assumed to still be available for secondary recovery procedures. In such a communication system, base stations, such as an evolved Node B (eNB), next generation node (gNB) or other network entity, may be responsible for communicating with user equipment.

When primary cells and secondary cells are operating on the same frequency and band, it is possible in new radio (NR) technology to configure carrier aggregation where the synchronization signal block is not transmitted in the secondary cell. Synchronization Signal Blocks (SSBs) and Synchronization Signal/Physical Broadcast Channel (SS/PBCH) Blocks comprise PSS and SSS signals, and Physical Broadcast Channels include PBCH and DMRS. In addition, SSB may carry cell identity (PCI, Physical Cell ID), and specific SSB of a cell can be identified based on the SSB index or SSB resource index or SSB time location index.

The CSI-RS configuration for beam management of the primary cell and secondary cell may be performed using the primary cell synchronization signal block for spatial and/or other types of QCL references across the component carriers, where the synchronization signal blocks are not transmitted on the secondary cell.

The CSI-RS may be configured for a UE carrier specifically where the PDCCH-TCI State configuration is carrier specific, leaving the network able to configure each cell/carrier, non-overlapping PDCCH-TCI State. This would result in beam failure detection resources, which may be referred to as a set of $q_0$, where the set may include SSB and/or CSI-RS resource indexes that do not overlap between cells, such as $q_{0\_PCell} \ne q_{0\_SCell}$, where $q_{0\_PCell}$ refers to PCell failure detection resources, $q_{0\_SCell}$ refers to SCell failure detection resources, and the implicit configuration of $q_0$ is based on the PDCCH beam indication. In a similar manner, with explicit $q_0$ configuration, the failure detection resources of PCell and SCell may not be the same, e.g., different PDCCH beams/TCI states are used for PCell and SCell. In some embodiments, the failure detection resources of two serving cells (refers to SCell or PCell) may not be the same. Thus, the primary cell failure does not automatically correspond to secondary cell failure.

Figure 2:
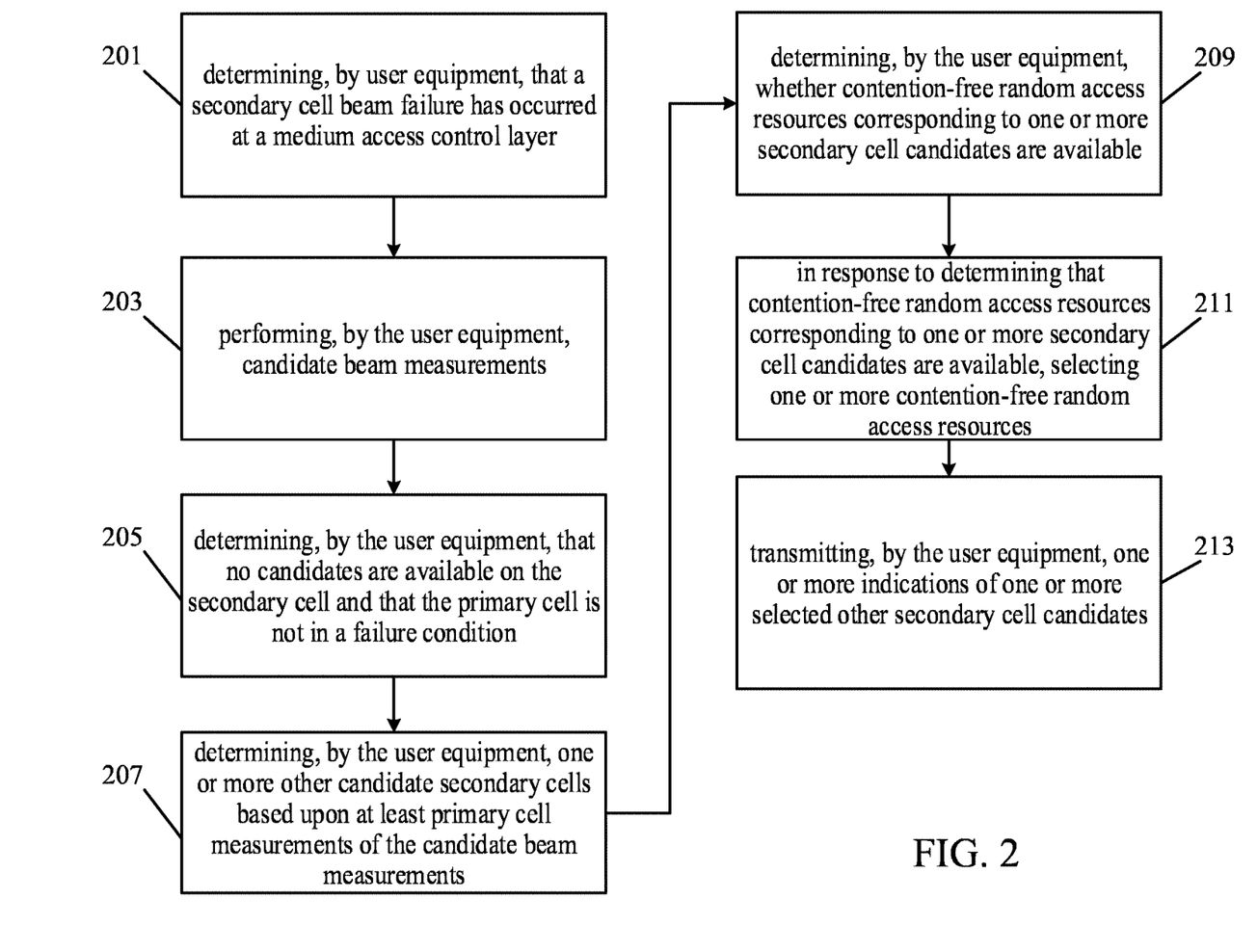
FIG. 2 illustrates an example of a method performed by user equipment according to certain embodiments.
Figure 5:
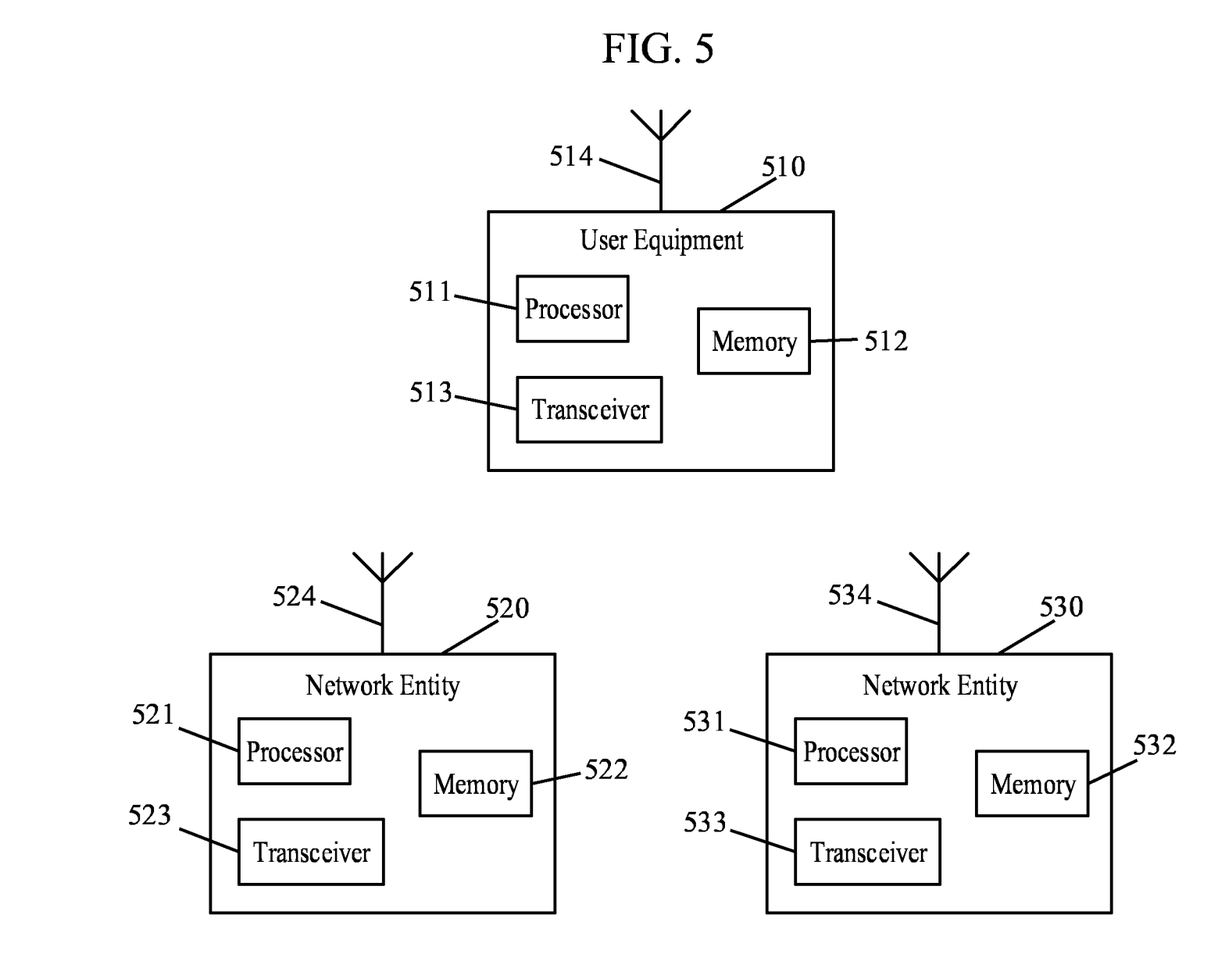
FIG. 5 illustrates an example of a system according to certain embodiments.

As an example, FIG. 2 illustrates a method performed by user equipment, such as user equipment 510 in FIG. 5. In step 201, the user equipment may determine that a secondary cell beam failure has occurred at a medium access control layer (other layers are not excluded). In step 203, the user equipment may perform candidate beam measurements on the secondary cell downlink reference signals, for example, CSI-RS and SS/PBCH Block (beam specific measurements). Candidate beam measurements may include L1 measurements, such as RSRP, RSRQ, SINR, hypothetical PDCCH BLER, or other L1 measurements. In some embodiments, the physical layer of the user equipment may perform candidate beam measurements on secondary cell signals, such as SSB. In step 205, the user equipment may determine that no candidates are available on the secondary cell and that the primary cell is not in a failure condition. In case the primary cell is in failure condition, the UE may prioritize the recovery of primary cell first. In step 207, the user equipment may determine one or more other candidate beams of secondary cells based upon at least measurements of the candidate beam measurements on primary cell. In step 209, the user equipment may determine whether contention-free random access (CFRA) resources for beam failure recovery corresponding to one or more candidate beams of secondary cells are available. In step 211, in response to determining that contention-free random access resources corresponding to one or more secondary cell candidates are available, the user equipment may select one or more contention-free random access resources. In step 213, the user equipment may transmit one or more indications of one or more selected other secondary cell candidate beams. These CFRA signal may be mapped to SCell uplink signaling resources or PCell signaling resources (or any serving cell uplink resources).

Figure 3:
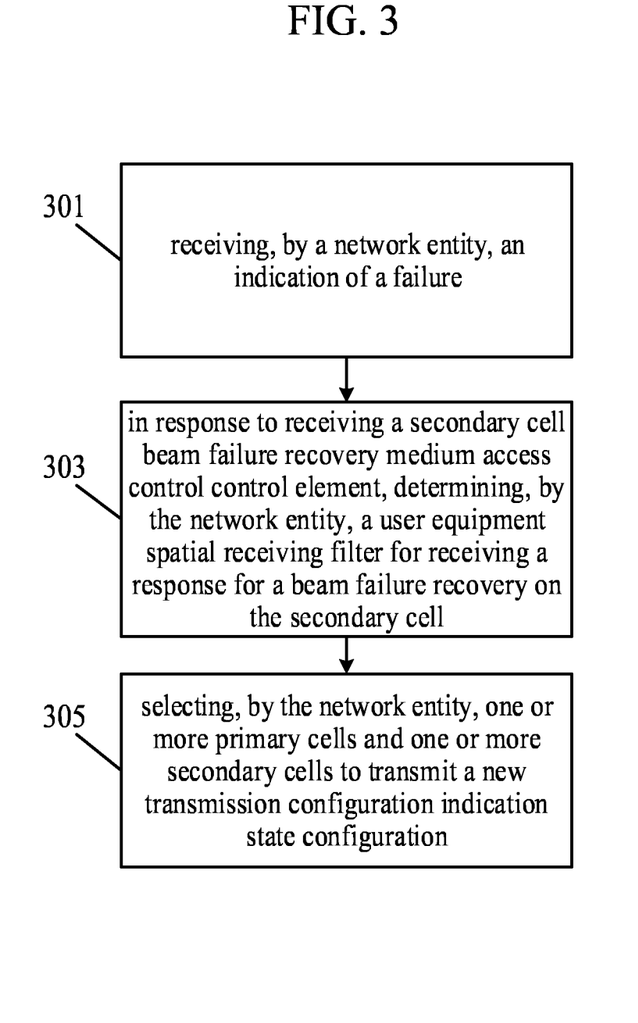
FIG. 3 illustrates an example of a method performed by a network entity according to certain embodiments.

FIG. 3 illustrates an example of a method performed by a network entity, such as network entity 520 and/or network entity 530 in FIG. 5. In step 301, a network entity may receive an indication of a failure. In some embodiments, the indication of a failure may indicate a secondary cell beam failure. In other embodiments, the indication of a failure may include a medium access control control element indicating one or more new candidate resources of a failed secondary cell. In step 303, in response to receiving a secondary cell beam failure recovery medium access control control element, the network entity may determine a user equipment spatial receiving filter for receiving a response for a beam failure recovery on the secondary cell.

In step 305, the network entity may select one or more primary cells and one or more secondary cells to transmit a new transmission configuration indication state configuration (for PDCCH). In various embodiments, if a synchronization signal block index has been indicated by UE as a new candidate beam, the network entity may provide a channel state information reference signal configuration corresponding with the synchronization signal block. In this way, network may initiate the beam refinement based UE indicated SS Block candidate. Alternatively, UE may indicate CSI-RS and network may initiate beam refinement by configuring additional reference signals corresponding to more refined beams. Beam refinement refers to a procedure where UE is requested feedback on measurements on more refined or narrower beams (that have typically higher beamforming gain but have narrower spatial coverage). This may improve the quality of communication.

Figure 4:
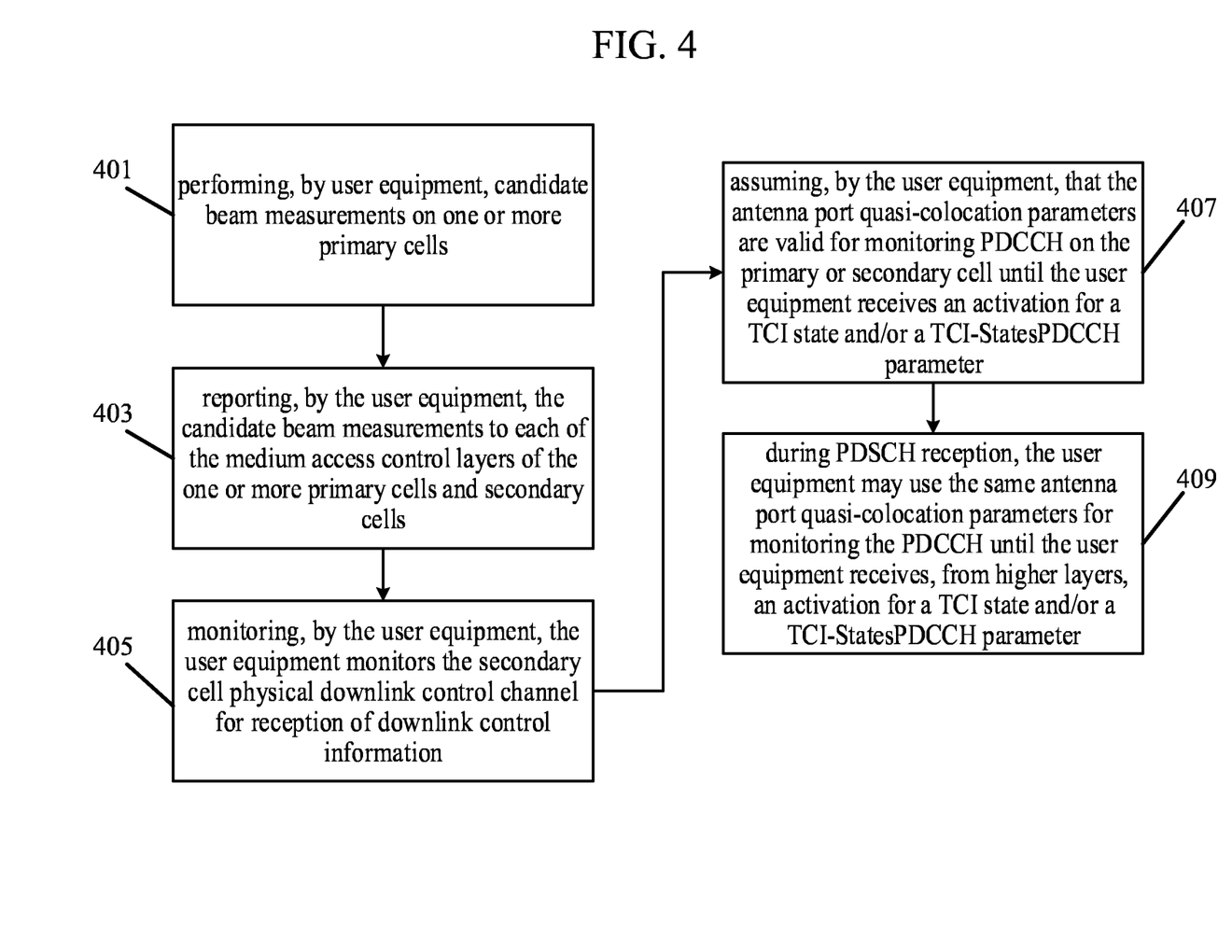
FIG. 4 illustrates an example of a method for link reconfiguration performed by a user equipment according to certain embodiments.

FIG. 4 illustrates another example of a method performed by user equipment, such user equipment 510 in FIG. 5. In some embodiments, the method described in FIG. 4 may be performed in combination with the method described in FIG. 2. In step 401, user equipment may perform candidate beam measurements on one or more primary cells, such as network entity 520, and/or secondary cells, such as network entity 530. In one example the MAC layer of user equipment may request PHY to perform such measurements on specific signal, or the measurements are provided by PHY without request, i.e. once the measurement results are obtained for specific signals, or UE provides measurements on signals it has detected.

In step 403, the user equipment may report to one or more or each of the serving cells (for example, PCell and/or one or more SCells) the measurements on one or more primary cells and/or secondary cells. In some embodiments, the reporting may include one or more channel state information reference signal resource indexes, one or more synchronization signal/physical broadcast channel resource indexes, and one or more corresponding reference signal received power measurements, such as L1-RSRP or RSRP). Measurements may also be provided using MAC control elements or RRC signaling. Measurement quantity measurements may include RSRP, RSRQ, hypothetical PDCCH BLER, SINR, or the like.

In some embodiments, if the user equipment determines that no secondary cell candidate signals are available, such as when indicated using CFRA signaling or using MAC CE, the user equipment may provide one or more measurements of primary cell reference signals that have cross-carrier quasi co-location assumption associated with a failed secondary cell. A quasi co-location may be a spatial RX assumption, such as when the UE determines signals with spatial RX assumption for SCell (or any serving cell based on another serving cell) to be received with same RX beam as in PCell. Other types of QCL are not excluded. When signals share the same QCL assumption between each other, it means they share the same indicted property such as delay spread, Doppler spread, Doppler shift, average delay, and/or spatial reception parameters. As an example, when signals have the spatial RX QCL assumption, it would mean that UE can assume a same RX beam (RX spatial filter configuration) when receiving the signals. Determining spatial RX filter configuration may be based on the indicated resource for beam failure recovery request and/or based on the selected resource indication by higher layer (i.e. MAC indicates PHY layer which resource was selected).

In some embodiments, a SCell beam failure may be detected based upon one or more CSI-RS configured as BFD-RS. Such failures may be detected where a PCell and/or a SCell with a working uplink connection associated with the failed SCell are not in a failure condition, and no suitable CSI-RS candidate beams exist (i.e. cannot be detected) on the SCell. The UE may detect a SCell beam failure based on CSI-RS in a set of $q_0$ SCell, and the UE cannot explicitly indicate any new candidate beams using CSI-RS measurements on the SCell. In response, the UE may assume spatial QCL for the PCell SSB and/or CSI-RS signals of one or more SCells, and determine one or more SCell candidates using one or more techniques, as discussed below.

For example, if an SSB (SS/PBCH Block) that is currently configured as an active TCI-State for PDCCH for the PCell is determined to have a cross carrier spatial QCL with the failed SCell, the UE may select and indicate the SSB as a candidate. If multiple SSBs are configured as TCI States for PDCCH UE may select an SSB with highest signal quality based on measurements.

In another example, if a cross carrier spatial QCL is determined for the CSI-RS that is configured as an active TCI-State for PDCCH for the PCell, the UE may select the corresponding SSB as a new candidate based upon the QCL determination. In this example, the SSB may be configured as a source QCL reference for CSI-RS, such as when they share the same indicated QCL parameter such as spatial RX.

Another sample scenario is where a cross carrier spatial QCL is assumed for an SSB that is configured as an active TCI-State for PDCCH for the PCell, and there is a spatial QCL associated with CSI-RS resources in the PCell. In this example, the UE may select one or more combinations of available SSBs and CSI-RSs, where SSB/CSI-RS groups share the same spatial QCL assumption with a PCell according to aggregated L1-RSRPs over QCL SSB and CSI-RB resources within a group. An aggregated L1-RSRP may be comprised of RSRP measurements of both SSB and CSI-RS of the same group.

Furthermore, if a cross carrier spatial QCL is assumed for a CSI-RS that is currently configured as an active TCI-StatesPDCCH for the PCell, the UE may select the corresponding SS block as the new candidate through QCL assumption.

Finally, if a beam failure is detected on a SCell, and cross carrier spatial QCL is assumed for a PCell SS block (or serving cell with uplink for beam failure recovery signaling), and the SS block or SS Blocks corresponding to the failed CSI-RS beams is above one or more thresholds, such as TH1, the SS block or SS Blocks may be selected as the new candidate and indicated to network. In some embodiments, the threshold may be static, or may depend on the particular SS block configured as an active TCI-StatesPDCCH or through QCL. This threshold, as an example, may be configured by network. TH1 may also be a candidate beam threshold configured for CFRA BFR, or it may be a TH configured in RACH procedure for selection of suitable SS Blocks for random access. Other thresholds are not excluded. Multiple SSBs may be indicated to network and for the spatial RX assumption for the failed SCell (UE configures RX spatial filter for the SCell according the RX assumption of the SSB on PCell) UE may select the best reported SSB. In case only one SSB is indicated as candidate, that is selected. In similar manner above methods can be applied for CSI-RS signals.

Finally, if a beam failure is detected on a SCell, cross carrier spatial QCL is assume for the SS block, and the SS block corresponding to the failed CSI-RS beams are above one or more thresholds, such as TH1, the SS block may be selected as the new candidate. In some embodiments, the threshold may be static, or may depend on the signal level of particular SS block configured as an active TCI-StatesPDCCH or through QCL. Threshold may thus be relative to specific SSB (where the relative offset may be configured by network e.g, X dB/mW compared to the specific SSB signal level) or a network configured absolute value.

In some embodiments, the UE reception spatial filter may be configured to assume the PDCCH DMRS of the SCell is spatially quasi co-located with the selected PCell SS block, CSI-RS, and/or SS block of the indicated CSI-RS through the spatial QCL assumption.

In step 405, in response to the user equipment indicating one or more channel state information reference signal resources and/or synchronization signal/physical broadcast channel block indexes from a primary cell, the user equipment monitors the secondary cell physical downlink control channel for reception of downlink control information. The downlink control information may be transmitted using UE specific identifier for the secondary cell (e.g. cyclic redundancy check scrambled by radio network temporary identifier). UE may start monitoring the network response to the indication of candidates (e.g. beginning from the next slot after transmission of an indication or N slots or after next PDCCH monitoring occasion after the indication of recovery request or the response monitoring may take into account NW configured delay. In one example, this delay may be an antenna panel activation delay i.e. after indication UE requires K-millisecond before it is able to receive on SCell. Based on the selected and indicated reference signal (a candidate beam), the UE may assume that for the SCell, the demodulation reference signal antenna port is associated with the PDCCH reception in a UE-specific search space if quasi co-located with a selected periodic channel state information reference signal resource or synchronization signal/physical broadcast channel block index regarding one or more of delay spread, Doppler spread, Doppler shift, average delay, and/or spatial reception parameters. In some embodiments, signals which share the same QCL assumption between each other may share one or more properties, such as delay spread, Doppler spread, Doppler shift, average delay, and/or spatial reception parameters.

In some embodiments, before the user equipment indicates one or more channel state information reference signals or SS blocks to network as new candidate beam upon the failure of SCell, the user equipment may monitor the PDCCH with quasi co-location assumptions prior to the beam failure.

In step 407, the user equipment assumes that the antenna port quasi-colocation parameters are valid for monitoring PDCCH on the primary or secondary cell until the user equipment receives an activation for a TCI state and/or a TCI-States for PDCCH parameter. In step 409, during PDSCH reception, the user equipment may use the same antenna port quasi-colocation parameters for monitoring the PDCCH until the user equipment receives, from higher layers, an activation for a TCI state and/or a TCI-States for PDCCH parameter.

In one embodiment, one or more contention free preambles for one or more secondary cells may be reserved on a primary cell or secondary cell uplink. A serving cell uplink where a serving cell may be another PCell in dual connectivity, referred to as SpCell). This may be referred to a physical random access channel of preamble resources (set of PRACH resources). The reserved preambles may be mapped to a synchronization signal block/CSI-RS that have cross carrier spatial Quasi Co-Location (QCL) assumptions for the failed secondary cell. In some embodiments, signals which share the same QCL assumption between each other may share one or more properties, such as delay spread, Doppler spread, Doppler shift, average delay, and/or spatial reception parameters.

In one embodiment, UE may be configured with CFRA (contention free random access) signals just to indicate failure of SCell. In this case the indicated failure may implicitly mean that UE assumes for SCell candidate the current TCI State for PDCCH (either SSB or CSI-RS or SSB through QCL assumption with CSI-RS). If the UE has only one TCI state for PDCCH, the candidate (for spatial QCL assumption for receiving on SCell) is implicitly the said TCI state. In cases of multiple TCI states for PDCCH, the CFRA signal may be TCI state specific. Furthermore, when a UE assumes the same spatial QCL assumption for a signal across one or more component carriers or bandwidth parts, the UE may use the same spatial filter to receive the signal on each of the component carriers where QCL assumption holds. Similarly, if two signals, such as CSI-RSs, share a spatial RX QCL assumption, the UE may assume the same spatial receive filter, such as a RX beam, for the reception of both signals. In addition, the UE may determine one or more properties of one or more signals based upon other signals when the QCL is indicated, such as by Doppler spread. The mapping may be directly to the reference signal, or may be through the QCL assumption of currently configured CSI-RS for primary PDCCH-TCIState.

In another embodiment, the user equipment may use MAC CE to indicate that the secondary cell has failed, and that no candidate beams are available to be indicated on the secondary cell. In other embodiments, the user equipment may indicate, using SCell candidate beams, one or more primary cell synchronization signal blocks that are above a first threshold, and select the highest reported SSB (SSB resource index, or SSB time location index and potentially the respective signal quality measurement) as the candidate, setting the receiving spatial filter according to the highest reported SSB block RX direction. In some embodiments, the threshold TH1 may be a network configured candidate beam selection threshold, such as an SS/PBCH Block (SSB) signal quality, including RSRP, RSRQ, and SINR. In some embodiments, when the candidate beam selections are above the threshold, the UE may consider the SSB as a potential beam failure recovery candidate. With multiple candidates indicated by the user equipment using MAC CE signaling, the user equipment may assume, for the SCell PDCCH reception, the spatial filters according to the highest reported SSB index of primary cell SS Blocks i.e. same RX beam/spatial filter configuration that was used for receiving primary cell SSB, is used for receiving the PDCCH on SCell. Alternatively, the signal in the above mentioned embodiment may also be a CSI-RS signal. The user equipment may prioritize certain contention free recovery resources if a corresponding downlink reference signal is above a predefined threshold. However, if unavailable, the user equipment switches to a MAC CE based on the indication of the secondary cell failure and potentially new candidates. MAC CE can also be used in similar manner as above to indicate SCell candidates using measurements on PCell signals when the PCell signals have cross-carrier QCL assumption as described herein.

FIG. 5 illustrates an example of a system according to certain embodiments. In one embodiment, a system may include multiple devices, such as, for example, user equipment 510, network entity 520, and network entity 530. Network entity 520 and network entity 530 may be a primary serving cell and/or a secondary serving cell, respectively.

Network entity 520 and network entity 530 may be one or more of a base station, such as an evolved node B (eNB) or next generation node B (gNB), a next generation radio access network (NG RAN), a serving gateway, a server, and/or any other access node or combination thereof. Furthermore, a citizens broadband radio service (CBRS) device (CBSD) may include one or more serving cells, such as network entity 520 and network entity 530. UE 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 511, 521, and 531. At least one memory may be provided in one or more of devices indicated at 512, 522, and 532. The memory may be fixed or removable. The memory may include computer program instructions or computer code contained therein. Processors 511, 521, and 531 and memory 512, 522, and 532 or a subset thereof, may be configured to provide means corresponding to the various blocks of FIGS. 1-4. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513, 523, and 533 may be provided, and one or more devices may also include at least one antenna, respectively illustrated as 514, 524, and 534. The device may have many antennas, such as an array of antennas configured for multiple input multiple output (MIMO) communications, or multiple antennas for multiple radio access technologies. Other configurations of these devices, for example, may be provided.

Transceivers 513, 523, and 533 may be a transmitter, a receiver, or both a transmitter and a receiver, or a unit or device that may be configured both for transmission and reception.

Processors 511, 521, and 531 may be embodied by any computational or data processing device, such as a central processing unit (CPU), application specific integrated circuit (ASIC), or comparable device. The processors may be implemented as a single controller, or a plurality of controllers or processors.

Memory 512, 522, and 532 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

One having ordinary skill in the art will readily understand that certain embodiments discussed above may be practiced with steps in a different order, and/or with hardware elements in configurations, which are different from those that are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
BFD-RS Beam Failure Detection Reference Signal
BFR Beam Failure Recovery
BFRQ Beam Failure Recovery Request
BLER Block Error Rate
CBRA Contention-Based Random Access
CBRACH Contention-Based Random Access Channel
CE Control Element
CFRA Contention Free Random Access
CORESET Control Resource Set
CSI-RS Channel State Information Reference Signal
DCI Downlink Control Information
DMRS Demodulation Reference Signal
FR Frequency Range
gNB 5G Node B
MAC Medium Access Control
NR New Radio
PBCH Physical Broadcast Channel
PCell Primary Cell
PDCCH Physical Downlink Control Channel
PDSCH Physical Downlink Shared Channel
PRACH Physical Random Access Channel
QCL Quasi Co-Location
QoS Quality of Service
RNTI Radio Network Temporary Identifier
RRC Radio Resource Control
RSRP Reference Signal Receive Power
RSRQ Reference Signal Receive Quality
Rx Reception
SCell Secondary Cell
SINR Signal-to-Interference-Plus-Noise Ratio
SS Synchronization Signal
SSB Synchronization Signal Block
SpCell Special Cell
TCI Transmission Configuration Indication
TH1 First Threshold
Tx Transmission
UE User Equipment

The invention claimed is:

1. An apparatus comprising
at least one processor; and
at least one memory including computer program code;
the at least one memory and the computer program code configured to, with the at least one processor, cause the apparatus at least to:
determine that beam failure on a secondary cell has been determined by at least at a medium access control layer;
determine one or more other secondary cell candidates based on at least candidate beam measurements of at least one serving cell;
transmit one or more data packets related to one or more determined other secondary cell candidates comprising using medium access control control element to indicate information on new secondary cell candidates, if new candidates can be indicated, wherein the medium access control control element accommodates information on several candidate beams configured to indicate a highest reported synchronization signal block index according to a network-configured candidate beam selection threshold; and
determine a spatial reception filter based on the transmitted data packets related to the determined other secondary cell candidates, wherein the spatial reception filter is configured to assume a physical downlink control channel demodulation reference signal of the secondary cell is spatially quasi co-located with at least one of a selected primary cell synchronization signal block, channel state information reference signal, or synchronization signal block of an indicated channel state information reference signal through a spatial quasi co-located assumption.

2. The apparatus according to claim 1, wherein the apparatus is further caused:
perform physical layer candidate beam measurements on the secondary cell.

3. The apparatus according to claim 2, wherein the apparatus is further caused to:
prior to performing the physical layer candidate beam measurements on the secondary cell, transmit a request for beam measurements to the secondary cell.

4. The apparatus according to claim 1, wherein the apparatus is further caused to:
reserve one or more contention free preambles for one or more secondary cells on a primary cell or secondary cell uplink.

5. The apparatus according to claim 1, wherein the apparatus is further caused to:
reserve one or more contention free preambles from physical random access channel of preamble resources.

6. The apparatus according to claim 1, wherein the apparatus is further caused to:

use a medium access control control element to indicate that the secondary cell has failed and that no candidates are available to be indicated on the secondary cell.

7. The apparatus according to claim 1, wherein the apparatus is further caused to:
determine whether contention-free random access resources corresponding to one or more secondary cell candidates are available.

8. The apparatus according to claim 1, wherein the apparatus is further caused to:
select one or more contention-free random access resources.

9. The apparatus according to claim 1, wherein the apparatus is further caused to:
in response to determining that contention-free random access resources corresponding to one or more secondary cell candidates are not available, generate a secondary cell beam failure recovery medium access control control element including information on new secondary cell candidates, if new candidates can be indicated.

10. The apparatus according to claim 1, wherein the apparatus is further caused to transmit one or more secondary cell beam failure indications without any candidate indications, when it has determined that no candidates are available based on a signal quality threshold value.

11. The apparatus according to claim 1, wherein determining one or more other secondary cell candidates based on at least candidate beam measurements of at least one serving cell comprises determining a secondary cell candidate when the candidate beam reference signal quality is equal to or higher than a signal quality threshold configured for the apparatus.

12. The apparatus according to claim 11, wherein the threshold is a synchronization signal block detection threshold or a defined threshold "SSBthreshold" in random access procedure.

13. The apparatus according to claim 11, wherein the threshold is used as reporting threshold for synchronization signal block candidates or channel state information reference signal candidates, when using a medium access control control element.

14. An apparatus comprising
at least one processor; and
at least one memory including computer program code;
the at least one memory and the computer program code configured to, with the at least one processor, cause the apparatus at least to:
receive an indication of a failure of a primary cell and/or secondary cell;
in response to receiving a secondary cell beam failure recovery medium access control control element, determine a user equipment spatial receiving filter for receiving a response for a beam failure recovery on the secondary cell, wherein the medium access control control element accommodates information on several candidate beams configured to indicate a highest reported synchronization signal block index according to a network-configured candidate beam selection threshold, wherein the spatial receiving filter is configured to assume a physical downlink control channel demodulation reference signal of the secondary cell is spatially quasi co-located with at least one of a selected primary cell synchronization signal block, channel state information reference signal, or synchronization signal block of an indicated channel state information reference signal through a spatial quasi co-located assumption; and
select candidate beam measurements from the physical layer of the secondary cell.

15. The apparatus according to claim 14, wherein the apparatus is further caused to:
upon the indication of a failure of a primary cell and/or secondary cell include a synchronization signal block index, providing a channel state information reference signal configuration corresponding to the indicated synchronization signal block.

\* \* \* \* \*